US010124515B2

(12) United States Patent
Ives

(10) Patent No.: US 10,124,515 B2
(45) Date of Patent: Nov. 13, 2018

(54) GEL MOLDED PILLOW AND METHOD OF PRODUCING THE SAME

(71) Applicant: Tempur-Pedic Management, LLC, Lexington, KY (US)

(72) Inventor: James T. Ives, Chruch Hill, TN (US)

(73) Assignee: Tempur-Pedic Management, LLC, Lexington, KY (US)

( * ) Notice: Subject to any disclaimer, the term of this patent is extended or adjusted under 35 U.S.C. 154(b) by 13 days.

(21) Appl. No.: 14/487,296

(22) Filed: Sep. 16, 2014

(65) Prior Publication Data

US 2016/0073800 A1 Mar. 17, 2016

(51) Int. Cl.
*B29C 44/12* (2006.01)
*A47G 9/10* (2006.01)
(Continued)

(52) U.S. Cl.
CPC ........ *B29C 44/1233* (2013.01); *A47C 27/085* (2013.01); *A47C 27/15* (2013.01); *A47G 9/1036* (2013.01); *B29C 44/1228* (2013.01); *A47G 2009/1018* (2013.01); *B29C 33/18* (2013.01); *B29K 2075/00* (2013.01);
(Continued)

(58) Field of Classification Search
CPC ..... B29C 44/1223; B29C 44/06; B29C 44/12; B29C 44/1228; B29C 44/1233; B29C 44/14; B29C 44/143; B29C 45/14; B29C 45/16; B29C 45/1642; B29K 2105/0061
USPC ......... 5/636; 264/46.4, 46.5, 46.6, 259, 261, 264/265, 266
See application file for complete search history.

(56) References Cited

U.S. PATENT DOCUMENTS 3,431,331 A * 3/1969 Pincus .................... B29C 33/00
249/113
4,130,614 A * 12/1978 Saidla ................... B29C 44/145
264/257
(Continued)

FOREIGN PATENT DOCUMENTS

CN 101851880 B 12/2001
CN 202604320 U 12/2012
(Continued)

OTHER PUBLICATIONS

Patent Cooperation Treaty, International Search Report, PCT/US2015/052839, dated Dec. 28, 2015, 3 pgs.
(Continued)

*Primary Examiner* — Eric J Kurilla
(74) *Attorney, Agent, or Firm* — Middleton Reutlinger

(57) ABSTRACT

A pillow is provided that includes a foam core and a gel insert molded to each side of the foam core. Methods of producing a pillow are further provided and include a step of providing a foam molding system having a top mold defining a plurality of air ports and a bottom mold defining a plurality of air ports. A vacuum is applied to the plurality of air ports in both the top mold and bottom mold, and a gel insert is then positioned against each of the plurality of air ports. A foam precursor is subsequently dispensed into the bottom mold atop the gel insert, and the top mold is secured to the bottom mold. The foam precursor then expands within the foam molding system and bonds with the two gel inserts to produce a pillow having a gel insert molded to each side of the pillow.

12 Claims, 3 Drawing Sheets

(51) Int. Cl.
  *A47C 27/08* (2006.01)
  *A47C 27/15* (2006.01)
  *B29K 75/00* (2006.01)
  *B29K 675/00* (2006.01)
  *B29L 31/00* (2006.01)
  *B29C 33/18* (2006.01)
  *B29K 105/00* (2006.01)

(52) U.S. Cl.
  CPC .. *B29K 2105/0061* (2013.01); *B29K 2675/00* (2013.01); *B29L 2031/751* (2013.01)

(56) References Cited

U.S. PATENT DOCUMENTS

| | | | |
|---|---|---|---|
| 5,090,334 A * | 2/1992 | Sutton | A47B 23/002 |
| | | | 108/43 |
| 5,441,676 A * | 8/1995 | Bigolin | B29C 44/12 |
| | | | 264/255 |
| 5,932,046 A | 8/1999 | Yates | |
| 6,082,683 A | 7/2000 | Yates | |
| 2001/0018777 A1 | 9/2001 | Walpin | |
| 2005/0278852 A1 | 12/2005 | Wahrmund et al. | |
| 2007/0246157 A1 | 10/2007 | Mason et al. | |
| 2011/0277923 A1 | 11/2011 | Fox et al. | |
| 2013/0263377 A1 | 10/2013 | Wootten, Jr. | |
| 2014/0054937 A1* | 2/2014 | Sam | B62J 1/22 |
| | | | 297/214 |
| 2015/0040324 A1* | 2/2015 | Dungan | A47G 9/1036 |
| | | | 5/644 |
| 2016/0022063 A1* | 1/2016 | Fulkerson | A47G 9/10 |
| | | | 5/636 |

FOREIGN PATENT DOCUMENTS

| | | |
|---|---|---|
| CN | 202723334 U | 2/2013 |
| CN | 203137802 U | 8/2013 |
| DE | 3627286 A1 | 2/1988 |
| DE | 100 05 919 A1 | 8/2001 |
| EP | 0316573 A1 | 5/1989 |
| EP | 0952072 A2 | 10/1999 |
| EP | 1060859 A2 | 12/2000 |
| EP | 1407867 A2 | 4/2004 |
| FR | 2841508 A1 | 1/2004 |
| JP | 2005110702 A | 4/2005 |
| WO | 2010075296 A1 | 7/2010 |
| WO | 2013152404 A1 | 10/2013 |
| WO | 2016053974 A1 | 4/2016 |

OTHER PUBLICATIONS

Patent Cooperation Treaty, Written Opinion of the International Searching Authority, PCT/US2015/052839, dated Dec. 28, 2015, 8 pgs.
Patent Cooperation Treaty, International Search Report, PCT/US2015/050359, dated Dec. 21, 2015, 3 pgs.
Patent Cooperation Treaty, Written Opinion of the International Searching Authority, PCT/US2015/050359, dated Dec. 21, 2015, 5 pgs.
European Patent Office, Extended Search Report, 15842913.4, dated Apr. 24, 2018, 9 pages.
European Patent Office, Extended Search Report, 15845886.9, dated May 14, 2018, 7 pages.

* cited by examiner

GEL MOLDED PILLOW AND METHOD OF PRODUCING THE SAME

TECHNICAL FIELD

The present invention relates to a gel molded pillow and method of producing the same. In particular, the present invention relates to a pillow that includes a gel insert molded into each side of the pillow and a method of producing the same.

BACKGROUND

As is generally the case with support cushions and, in particular, with support cushions comprised of flexible foam or other body-conforming materials, the effectiveness of the support cushion in providing support to the body of a user is partly a function of how well the flexible foam responds to the contour of the particular user resting on the cushion. In this regard, support cushions made from temperature-sensitive visco-elastic foam are often particularly desirable as such support cushions are able to change shape based, at least in part upon the temperature of the supported body part. That conformance of the cushion to the body of a user, however, often causes more of the user's body to be in contact with the body support cushion, and thus, less of the body of the user is exposed to the ambient air around the cushion. The reduction in the amount of the body of the user exposed to ambient air, in turn, causes many users to find support cushions comprised of visco-elastic foam to "sleep hot" and, occasionally, such users will choose other types of support cushions, notwithstanding the supportive benefits associated with visco-elastic foam and similar types of body-conforming materials.

In an effort to remedy users' concerns of "sleeping hot" as a result of the body-conforming qualities of their support cushions, many support cushion manufacturers have incorporated so-called "cooling" technologies into their products. For example, many body-conforming support cushions now incorporate latent heat storage units, such as phase change materials or cooling gel inserts, that absorb heat and provide a cooling effect when in contact with the body of a user. To date, however, support cushions including those latent heat storage units have typically only incorporated the latent heat storage units into a single side of the support cushion, and, consequently, the number of orientations in which the support cushions can provide a cooling effect to the user has been limited.

SUMMARY

The present invention is a gel molded pillow and method of producing the same. In particular, the present invention is a pillow that includes a gel insert molded into each side of the pillow and a method of producing the same.

In one exemplary embodiment of the present invention, a support cushion in the form of a pillow is provided that includes a foam core having a first side and a second side opposite the first side. The pillow further comprises a first gel insert that is molded into the first side of the foam core, and a second gel insert that is molded into the second side of the foam core. In this regard, the first gel insert along with a portion of the first side of the foam core surrounding the first gel insert forms a first support surface of the pillow, while the second gel insert along with a portion of the second side of the foam core surrounding the second gel insert forms the second support surface of the pillow.

The foam core of the exemplary pillow is generally comprised of a flexible loam capable of suitably distributing pressure from a user's body or portion thereof across the pillow. On the other hand, each gel insert is generally comprised of a substantially uniform layer of elastomeric gelatinous material that is capable of providing a cooling effect by acting as a thermal dump or heat sink into which heat from a user's body, or portion thereof, positioned on the pillow can dissipate. To provide such a cooling effect, the first and second gel inserts typically have a sufficient thickness, but still generally have a thickness that is substantially less than the thickness of the entire pillow such that a portion of the foam core extends between the first and second gel inserts.

Each of the exemplary support cushions described herein are typically produced by making use of a foam molding system onto which a vacuum can be applied to hold the gel inserts in place during the formation of the support cushion. In one exemplary implementation of a method for producing a support cushion in accordance with the present invention, a foam molding system for producing a pillow is first provided that comprises a top mold and a bottom mold, with the top mold defining a recessed portion and the bottom mold similarly defining another recessed portion. In this regard, when the top mold is secured to the bottom mold, the recessed portion of the top mold and the recessed portion of the bottom mold align with one another to form a single internal cavity that, in turn, is the negative of the pillow produced by the foam molding system.

With further respect to the foam molding system, the foam molding system also has a first contact surface in the recessed portion of the top mold that defines a plurality of air ports extending through the first contact surface. Likewise, a second contact surface is included in the recessed portion of the bottom mold and defines a plurality of air ports extending through the second contact surface. The foam molding system additionally includes a vacuum pump that is operably connected to the plurality of air ports defined by the first contact surface in the top mold as well as the plurality of air ports defined by the second contact surface in the bottom mold. The vacuum pump is also operably connected to an air control unit and, in connection with the air control unit, is configured to independently apply a vacuum to the air ports defined by the first contact surface in the top mold and to the air ports defined by the second contact surface in the bottom mold.

Upon providing the foam molding system, to produce an exemplary support cushion in the form of a pillow, the air control unit of the foam molding system is subsequently activated and causes the vacuum pump to apply a vacuum to the plurality of air ports defined by the first contact surface of the top mold and to the plurality of air ports defined by the second contact surface of the bottom mold. Once the air control unit and vacuum pump are activated and a vacuum is applied to the plurality of air ports, a first gel insert is positioned in the top mold of the foam molding system and a second gel insert is positioned in the bottom mold of the foam molding system, with each of the gel inserts being held in place by the applied vacuum. Then, after positioning the gel inserts in the respective molds, a foam precursor is dispensed in the bottom mold atop the second gel insert, and the top mold is secured to the bottom mold before the foam precursor expands to a point that would prevent the top mold from being adequately secured to the bottom mold.

After the foam precursor expands, the foam precursor then sets so that it is bonded to the first and second gel inserts and produces a pillow with the first gel insert molded to a first side of a foam core and the second gel insert molded to a second side of the foam core opposite the first side. Once the foam precursor has set, the pillow can then be removed from the foam molding system and allowed to completely cure to produce a final manufactured pillow.

Further features and advantages of the present invention will become evident to those of ordinary skill in the art after a study of the description, figures, and non-limiting examples in this document.

DESCRIPTION OF EXEMPLARY EMBODIMENTS

The present invention is a gel molded pillow and method of producing the same. In particular, the present invention is a pillow that includes a gel insert molded into each side of the pillow and a method of producing the same.

Figure 1:
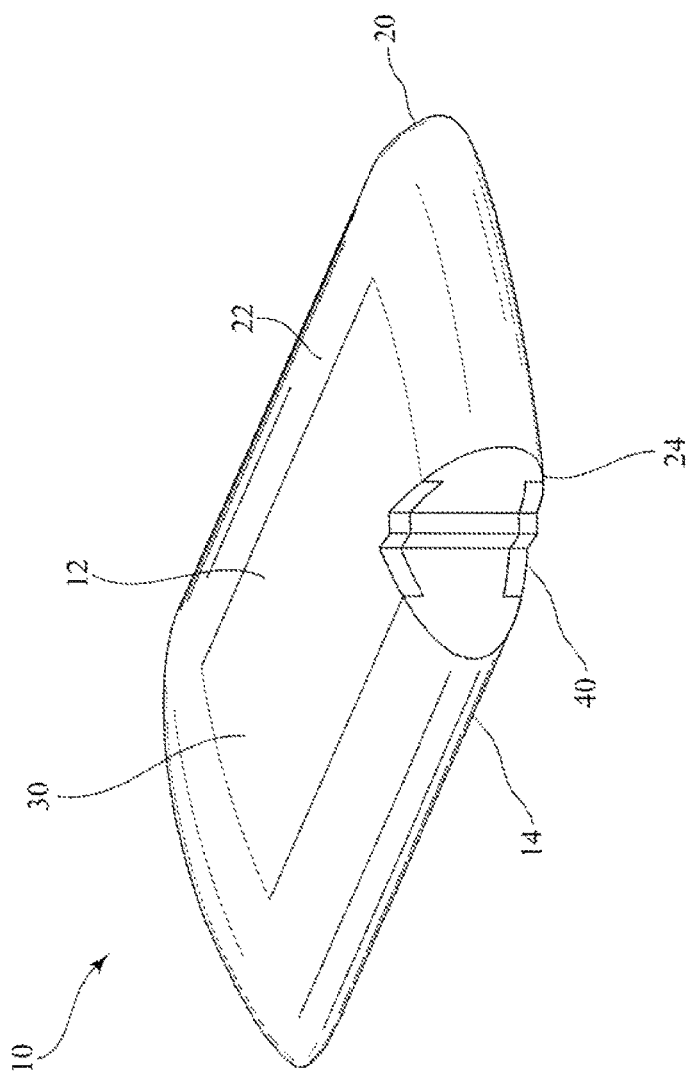
FIG. 1 is a perspective view of an exemplary pillow made in accordance with the present invention, with a portion of the pillow removed to show gel inserts molded into each side of the pillow.

Referring first to FIG. 1, in one exemplary embodiment of the present invention, a support cushion in the form of a pillow 10 is provided that includes a foam core 20 having a first side 22 and a second side 24 opposite the first side 22. The pillow 10 further comprises a first gel insert 30 that is molded to the first side 22 of the foam core 20, and a second gel insert 40 that is molded to the second side 24 of the foam core 20. In particular, in the pillow 10, both the first gel insert 30 and the second gel insert 40 are substantially identical to one another and are generally rectangular-shaped and cover a substantial portion of the first side 22 and the second side 24 of the foam core 20, respectively. In this regard, the first gel insert 30 along with a portion of the first side 22 of the foam core 20 surrounding the first gel insert 30 forms a first support surface 12 of the pillow 10, while the second gel insert 40 along with a portion of the second side 24 of the foam core 20 surrounding the second gel insert 40 forms the second support surface 14 of the pillow.

With further respect to the foam core 20 of the pillow 10, the foam core 20 is generally comprised of a flexible foam that is capable of suitably distributing pressure from a user's body or portion thereof across the pillow 10. Such flexible foams include, but are not limited to, latex foam, reticulated or non-reticulated visco-elastic foam (sometimes referred to as memory foam or low-resilience foam), reticulated or non-reticulated non-visco-elastic foam, polyurethane high-resilience foam, expanded polymer foams (e.g., expanded ethylene vinyl acetate, polypropylene, polystyrene, or polyethylene), and the like, in the embodiment shown in FIG. 1, the foam core 20 is comprised of a visco-elastic foam that has a low resilience as well as a sufficient, density and hardness, which allows pressure to be absorbed uniformly and distributed evenly across the foam core 20 of the pillow 10. Generally, such visco-elastic foams have a hardness of at least about 10 N to no greater than about 80 N, as measured by exerting pressure from a plate against a sample of the material to a compression of at least 40% of an original thickness of the material at approximately room temperature (i.e., 21° C. to 23° C.), where the 40% compression, is held for a set period of time as established by the International Organization of Standardization (ISO) 2439 hardness measuring standard. In some embodiments, the visco-elastic foam comprising the foam core 20 has a hardness of about 10 N, about 20 N, about 30 N, about 40 N, about 50 N, about 60 N, about 70 N, or about 80 N to provide a desired degree of comfort and body-conforming qualities.

The visco-elastic foam described herein for use in the foam core 20 of the pillow 10 can also have a density that assists in providing a desired degree of comfort and body-conforming qualities, as well as an increased degree of material durability. In some embodiments, the density of the visco-elastic foam used in the foam core 20 has a density of no less than about 30 kg/m$^3$ to no greater than about 150 kg/m$^3$. In some embodiments, the density of the visco-elastic foam used in the foam core 20 of the pillow 10 is about 30 kg/m$^3$, about 40 kg/m$^3$, about 50 kg/m$^3$, about 60 kg/m$^3$, about 70 kg/m$^3$ about 80 kg/m$^3$, about 90 kg/m$^3$ about 100 kg/m$^3$, about 110 kg/m$^3$ about 120 kg/m$^3$, about 130 kg/m$^3$ about 140 kg/m$^3$, or about 150 kg/m$^3$. Of course, the selection of a visco-elastic foam having a particular density will affect other characteristics of the foam, including its hardness, the manner in which the foam responds to pressure, and the overall feel of the foam, but it is appreciated that a visco-elastic foam having a desired density and hardness can readily be selected for a particular application as desired.

Turning now to the gel inserts 30, 40 included in the pillow 10, each gel insert 30, 40 is generally comprised of a substantially uniform layer of elastomeric gelatinous material that is capable of providing a cooling effect by acting as a thermal dump or heat sink into winch heat from a user's body, or portion thereof positioned on the pillow 10 can dissipate. For example, in the embodiment shown in FIG. 1, the gel inserts 30, 40 are comprised of a polyurethane-based gel made by combining Hyperlast® LU 1046 Polyol, Hyperlast® LP 5613 isocyanate, and a thermoplastic polyurethane film, which are each manufactured and sold by Dow Chemical Company Corp. (Midland, Mich.), and which can be combined to produce gel inserts having a thermal conductivity of 0.1776 W/m*K, a thermal diffusivity of 0.1184 mm$^2$/s, and a volumetric specific heat of 1.503 MJ/(m$^3$K) as established by the International Organization of Standardization (ISO) 22007-2 volumetric specific heat measuring standard. It is also contemplated, however, that numerous other types of gels capable of absorbing an amount of heat and providing a cooling effect can be used in accordance with the present invention, and can be produced to have desired thermal conductivity, thermal diffusivity, and volumetric specific heat without departing from the spirit and scope of the subject matter described herein.

Referring still to FIG. 1, the first gel insert 30 mid the second gel insert 40 of the pillow 10 typically have a thickness that is substantially less than the thickness of the pillow 10, such that a portion of the foam core 20 extends between the first gel insert 30 and the second gel insert 40. In one preferred embodiment, the first gel insert 30 and the second gel insert 40 each have a thickness of about 2 mm to about 10 mm (e.g., 4 mm) so as to allow both the first and second gel inserts 30, 40 to provide a sufficient heat sink and, consequently, a cooling effect to a user without interfering with the ability of the pillow 10 to allow pressure to be absorbed uniformly and distributed evenly across the loam core 20 of the pillow 10. Of course, gel inserts having various other thicknesses can also be readily incorporated into an exemplary support cushion of the present invention and used to provide a desired amount of heat-absorbing qualities. Furthermore, it is appreciated that the gel inserts used in accordance with the support cushions of the present invention can be formed in any of a number of other shapes (e.g., shapes other than the rectangular-shaped gel inserts 30, 40 shown in FIG. 1) and that the support cushions of the present invention can also include more than one gel insert molded to each side of an exemplary support cushion in any number of desired configurations without departing from the spirit and scope of the subject matter described herein.

As a further refinement to the pillow 10 of the present invention, and although not shown in FIG. 1, various covers can also be included and used to cover various portions of the pillow 10. For example, it is contemplated that the pillow 10 can further Include a cover that surrounds the foam core 20, the first gel insert 30, and the second gel insert 40. The cover can be in the form of a fire sock that surround the various layers and is comprised of a flame retardant material in some embodiments, an exemplary cover of the present invention can also be comprised of another textile, such as cotton, that provides an exemplary pillow with a unitary appearance, but that also provides a user with a sufficiently soft surface on which to rest without interfering with the cooling effect provided by the underlying gel insert.

As yet another refinement to the present invention, although the support cushion shown in FIG. 1 is in the form of a pillow 10 and is dimensionally sized to support the head of a user, it is contemplated that the features described herein are equally applicable to mattresses, seat cushions, seat backs, neck pillows, leg spacer pillows, mattress toppers, overlays, and the like. As such, the phrase "support cushion" is used herein to refer to any and all such objects having any size and shape, and that are capable of or are generally used to support the body of a user or a portion thereof.

Regardless of the particular type of support cushion contemplated by the present invention, each of the exemplary support cushions described herein are typically produced by making use of a foam molding system onto which a vacuum can be applied to hold the gel inserts in place during the formation of the support cushion. In one exemplary implementation of a method for producing a pillow, such as the pillow 10 described above, and referring now to FIGS. 2 and 3, a loam molding system 100 is first provided, as indicated by step 200. The foam molding system 100 comprises a lop mold 150 and a bottom mold 160, with the top mold 150 defining a recessed portion 152 and the bottom mold 160 similarly defining a recessed portion 162. In this regard, when the top mold 150 is secured to the bottom mold 160, the recessed portion 152 of the top mold 150 and the recessed portion 162 of the bottom mold align with one another to form a single internal cavity that, in turn, is the negative of the pillow produced by the foam, molding system 100 (e.g., the pillow 10 described above with reference to FIG. 1).

With further respect to the foam molding system 100, the foam molding system 100 also has a first contact surface 154 in the recessed portion 152 of the top mold 150 that defines a plurality of air ports 156 extending through the first contact surface 154. Likewise, the foam molding system 100 has a second contact surface 164 in the recessed portion 162 of the bottom mold 160 that defines a plurality of air ports 166 extending through the second contact surface 164. The foam molding system 100 further includes a vacuum pump 180 that is operably connected to the plurality of air ports 156 defined by the first contact surface 154 in the top mold 150 as well as the plurality of air ports 156 defined by the second contact surface 164 in the bottom mold 160. The vacuum pump 180 is operably connected to an air control unit 170 and, in connection with the air control unit 170, is configured to independently apply a vacuum to the air ports 156 defined by the first contact surface 154 in the top mold 150 and to the air ports 166 defined by the second contact surface 164 in the bottom mold 160, the importance of which is discussed in further detail below.

Figure 2:
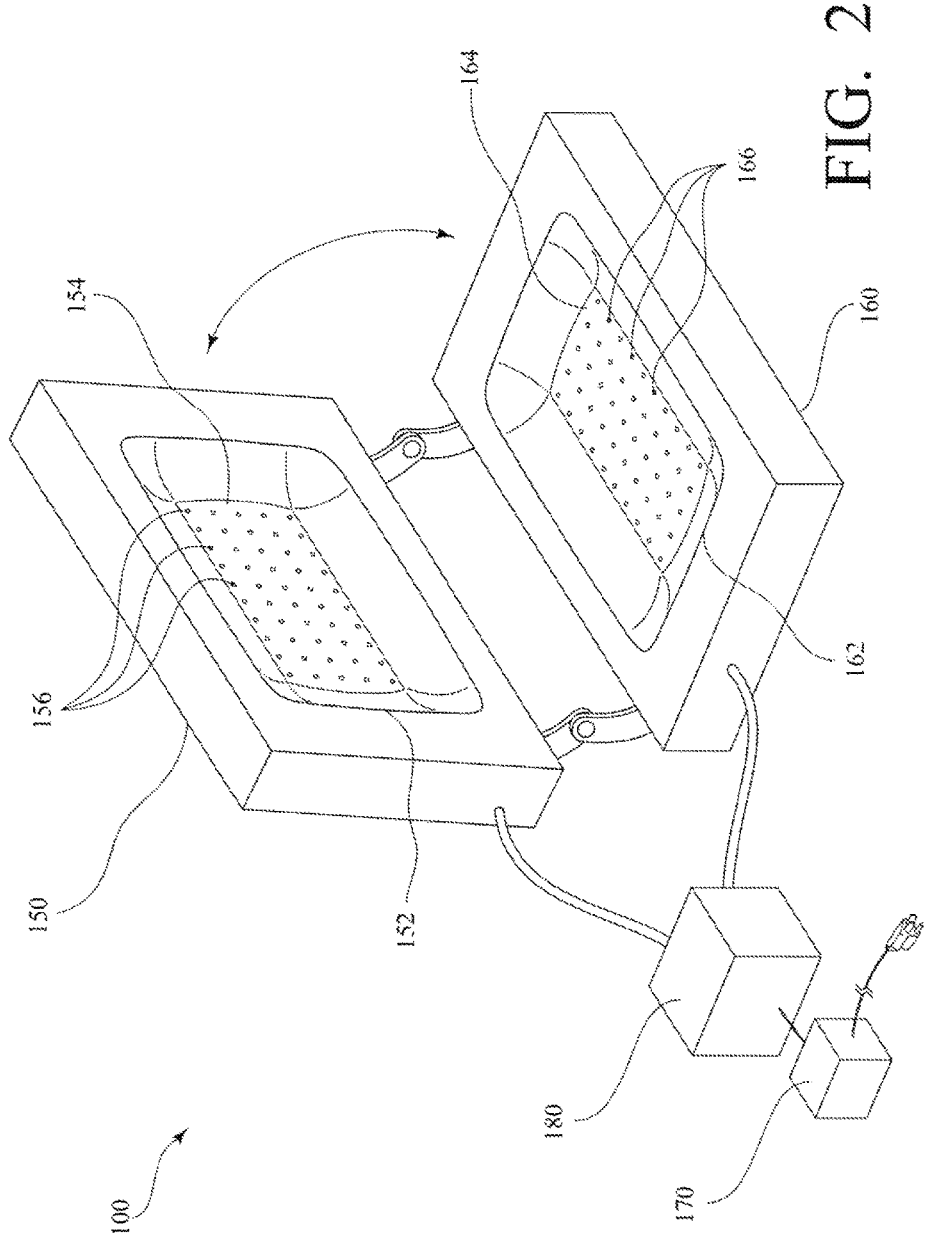
FIG. 2 is a schematic representation of an exemplary foam molding system for producing the pillow of FIG. 1.
Figure 3:
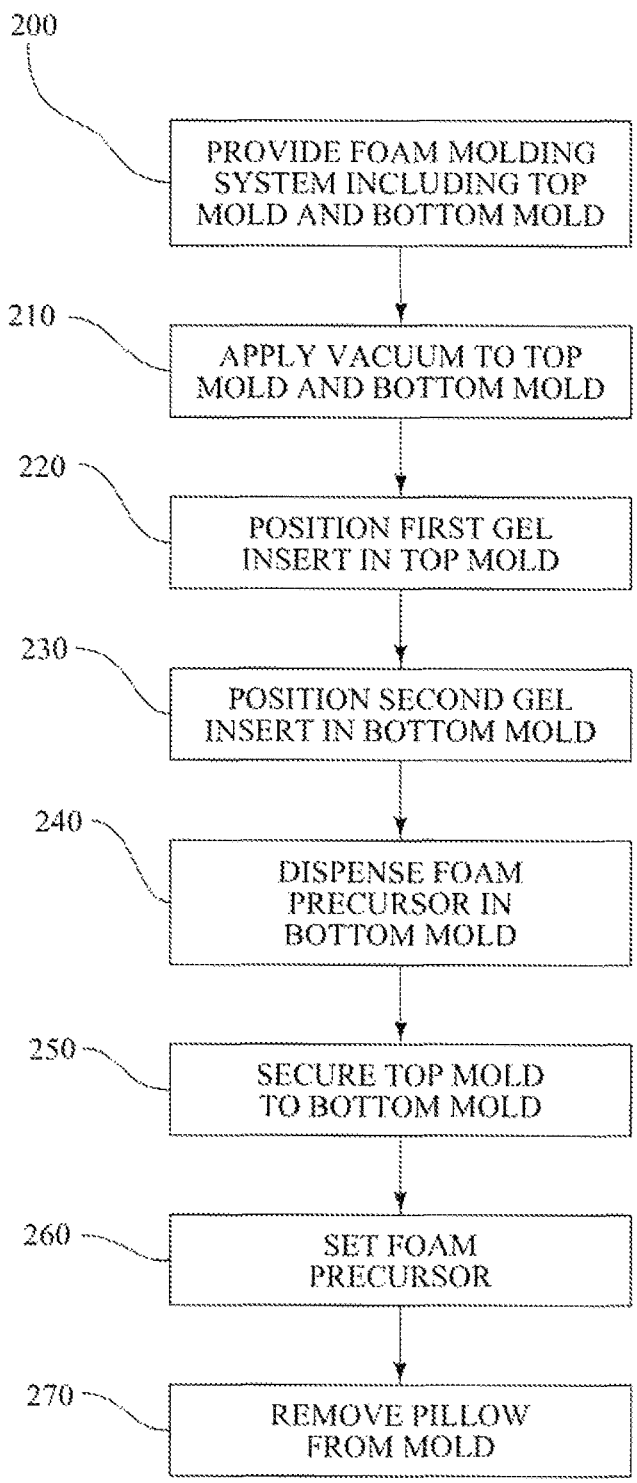
FIG. 3 is a flowchart showing an exemplary implementation of a method of producing the pillow of FIG. 1.

Referring still to FIGS. 2 and 3, upon providing the foam molding system 100, the air control unit 170 of foam molding system 100 is subsequently activated and sends an output signal to the vacuum pump 180 to cause the vacuum pump to apply a vacuum to the plurality of air ports 156 defined by the first contact surface 154 in the top mold 150 and to the plurality of air ports 166 defined by the second contact surface 164 in the bottom mold 160, as indicated by step 210. To this end, in this exemplary embodiment, the air control unit 170 thus directs the vacuum pump to continuously draw a volume of air from adjacent to the first contact surface 154 in the top mold 150 and from adjacent to the second contact surface 164 in the bottom mold 160 and then through the plurality of air ports 156, 166 in the top and bottom molds 150, 160 to thereby create or otherwise apply a vacuum to the plurality of air ports 156, 166 in the top and bottom molds 150, 160. In this regard, in some implementations of the methods of the present invention and although not shown in FIGS. 2 and 3, one or both of the plurality of air ports 356, 166 can be positioned in line with a corresponding constriction in an underlying conduit such that when the vacuum generator 180 is activated, the vacuum generator 180 causes an amount of air to move through the conduit and, in turn, causes an increase in air speed and a reduction in air pressure at the constriction (i.e., a Venturi effect) that allows a lower amount of vacuum to be applied to the plurality of air ports 156, 166 in the top or bottom molds 150, 160. In general the venturi vacuum system is preferred for lower vacuum requirements (i.e. <50 cfm) and the vacuum pump is preferred for higher requirements. Either system can be utilized however, heavier gel sheets require higher vacuum requirements. Mold curing angle and gel sheet weight dictate that the vacuum pump be used in step 220 and the venturi system be used in step 230. FIG. 3

With further respect to the air control unit 170, in some implementations, the air control unit 170 is configured to automatically control the strength of the vacuum that is applied to the plurality of air ports 156 defined by the first contact surface 154 in the top mold 150 and to the plurality of air ports 166 defined by the second contact surface 164 in the bottom mold 160. For example, in some implementations, the air control unit 170 is configured to apply a vacuum that moves about 300 cfm or more of air (e.g., about 320 cfm) through the plurality of air ports 156 defined by the top mold 150 and about 30 cfm or less of air through the plurality of air ports 166 defined by the bottom mold.

Referring still to FIGS. 2-3, once the air control unit 170 and vacuum pump 180 are activated and a vacuum is applied to each of the plurality of air ports 156, 166, a first gel insert is positioned in the top mold 150 of the foam molding system 100, as indicated by step 220, and a second gel insert is positioned in the bottom mold 160 of the foam molding system 100, as indicated by step 230. More specifically, in the foam molding system 100, the first gel insert is typically positioned against the plurality of air ports 156 defined by the first contact surface 154 of the top mold 150 when the first contact surface 154 is in a substantially vertical position (i.e., when the top mold 150 is in the open position as shown in FIG. 2). As a result of the vacuum applied to the plurality of air ports 156 in the top mold 150, the first gel insert maintains its position against the first contact surface 154 when the top mold 150 is rotated downward and secured to the bottom mold 160, as described below, such that the first gel insert is then securely held below and against the first contact surface 154. In this regard, the strength of the vacuum applied to the plurality of air ports 156 defined by the first contact surface 154 of the top mold 150 is typically of a sufficient strength to prevent the first gel insert 30 from falling away from the first contact surface 154 when the top mold 150 is in both the open and closed positions.

By comparison, the second gel insert is positioned on top of the plurality of air ports 166 defined by the second contact surface 164 in the bottom mold 160 and is kept in a horizontal position. As such, and as indicated above, the strength of the vacuum applied to the plurality of air ports 166 defined by the second contact surface 164 in the bottom mold 160 is typically not as strong as the vacuum applied to the plurality of air ports 156 of the top mold 150.

Upon positioning both the first and second gel inserts in the respective molds 150, 160, a foam precursor is then dispensed into the bottom mold 160 atop the second gel insert, as indicated by step 240. As would be recognized by those of skill in the art, such foam precursors are generally a liquid composition that includes one or more polymeric precursors and that, upon curing, forms a solid foam product (e.g., a pillow). For instance, in one exemplary implementation, the foam precursor dispensed into the bottom mold 160 of the foam molding system 100 is a viscoelastic foam precursor that is comprised of isocyanate, polyol, and other additives known in the art, and which, upon curing, are capable of forming the flexible visco-elastic foam of the foam core 20 in the pillow 10 described above with reference to FIG. 1.

Regardless of the particular type of foam utilized, once each of the components of the foam precursor are combined and dispensed into the bottom mold 160, the foam precursor then increases in volume as it cures such that a relatively small amount of liquid foam precursor is necessary to form the foam core of an exemplary pillow. For example, in the exemplary embodiment shown in FIGS. 2-3, the volume of liquid foam precursor is substantially less than the volume of the recessed portion 162 defined by the bottom mold 160 such that the step of dispensing the foam precursor comprises injecting or pouring the foam precursor Into the recessed portion 162 of the open bottom mold 160 directly over the second gel insert.

Referring still to FIGS. 2 and 3, after dispensing the foam precursor into the bottom mold 160, the top mold 150 is then secured to the bottom mold 160, as indicated by step 250. As shown in FIG. 2, in the exemplary foam molding system 100, the top mold 150 is hingedly connected to the bottom mold 160 such that the top mold 150 rotates downward to engage the bottom mold 160 similar to a clam shell in order to allow the top mold 150 to be quickly secured to the bottom mold 160 before the foam precursor expands to a volume that would prevent or hinder the securing of the top mold 150 to the bottom mold 160. Upon securing the top mold 150 to the bottom mold 160, the loam precursor Is then allowed to expand and completely fill the internal cavity formed from the recessed portions 152, 162 of the top mold 150 and the bottom mold 160.

After the foam precursor expands, the foam precursor then sets in the foam molding system 100 such that the resulting expanded foam is bonded to the first and second gel inserts, as indicated by step 260. In some embodiments, the time required for the foam precursor to fully expand and set is about 10 to about 15 minutes, and in one preferred embodiment, the time is about 12 minutes. It is appreciated, however, that the time required for the foam precursor to set will depend on the particular components of the foam precursor and that foam precursors having a particular setting time can readily be ascertained and selected by one skilled in the art.

After the foam precursor has reacted for an appropriate amount of time and the foam precursor has set, a pillow is thereby formed and can then be removed from the foam molding system 100, as indicated by step 270. Specifically, to remove the pillow from the foam molding system 100, the top mold 150 is removed from the bottom mold 160 to allow the resulting pillow to be easily lifted from the bottom mold 160 and folly cured outside of the foam molding system 100. In some implementations, the curing of an exemplary pillow produced by the present invention can take about 2 hours to about 4 hours, with an additional amount of time to allow the exothermic reaction of the foam precursor to complete and to allow the resulting pillow to fully cool. Of course, the pillow may also cure within the foam molding system 100 itself; however, because of the extended curing time, in some implementations, if is more economical to remove the pillow and allow the foam precursor to cure separate from the foam molding system 100 so that steps 200-260 may be repeated in the production of additional pillows or support cushions.

One of ordinary skill in the art will recognize that additional embodiments are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and may be made without departing from the spirit or scope of the claimed invention.

What is claimed is:

1. A method of producing a pillow, comprising the steps of:
   providing a foam molding system having an open position and a closed position, the foam molding system including a top mold defining a plurality of air ports extending through the top mold, and a bottom mold defining a plurality of air ports extending through the bottom mold;
   applying a vacuum to the plurality of air ports defined by the top mold and to the plurality of air ports defined by the bottom mold;
   positioning a first gel insert against the plurality of air ports defined by the top mold when the foam molding system is in an open position, such that the first gel insert is held against the plurality of air ports defined by the top mold as a result of the applied vacuum;
   positioning a second gel insert against the plurality of air ports defined by the bottom mold, such that the second gel insert is held against the plurality of air ports defined by the bottom mold as a result of the applied vacuum;
   dispensing a foam precursor into the bottom mold atop the second gel insert; and
   securing the top mold to the bottom mold to place the foam molding system in the closed position, such that, upon reaction and expansion of the foam precursor, the molded foam pillow is produced having the first gel insert positioned on a first top side of the molded foam pillow and the second gel insert positioned on a second bottom side of the molded foam pillow opposite the first top side;

wherein the vacuum applied to the plurality of air ports defined by the top mold is sufficient to hold the first gel insert against the top mold when the foam molding system is in the open position and when the foam molding system is in the closed position while the foam precursor reacts and expands.

2. The method of claim 1, wherein the step of applying the vacuum comprises applying a first vacuum to the plurality of air ports defined by the top mold and applying a second vacuum to the plurality of air ports defined by the bottom mold.

3. The method of claim 2, wherein the first vacuum applied to the top mold is greater than the second vacuum applied to the bottom mold.

4. The method of claim 3, wherein, prior to positioning the first gel insert and the second gel insert, the vacuum applied to the bottom mold moves less than about 30 cfm of air through the plurality of air ports defined by the bottom mold and the vacuum applied to the top mold moves greater than about 300 cfm of air through the plurality of air ports defined by the top mold.

5. The method of claim 1, wherein the plurality of air ports defined by the top mold and the plurality of air ports defined by the bottom mold are each arranged in an array.

6. The method of claim 1, wherein the foam molding system further includes a vacuum pump operably connected to the plurality of air ports defined by the top mold and to the plurality of air ports defined by the bottom mold, the vacuum pump for applying the vacuum.

7. The method of claim 6, wherein the foam molding system further comprises an air control unit for controlling the vacuum pump.

8. The method of claim 1, further comprising the step of setting the foam precursor in the foam molding system for an amount of time sufficient to allow the first gel insert and the second gel insert to bond to the setting foam precursor.

9. The method of claim 8, wherein the amount of time is about ten to about fifteen minutes.

10. The method of claim 8, further comprising the step of removing the molded foam pillow from the foam molding system subsequent to setting the foam precursor.

11. The method of claim 1, wherein the foam precursor is a visco-elastic foam precursor.

12. A pillow produced by the method of claim 1.

* * * * *